United States Patent [19]
Schmutz et al.

[11] Patent Number: 5,633,487
[45] Date of Patent: May 27, 1997

[54] MULTI-FOCAL VISION SYSTEM

[75] Inventors: Lawrence E. Schmutz, Watertown; Jeffrey Yorsz, Winchester, both of Mass.

[73] Assignee: Adaptive Optics Associates, Inc., Cambridge, Mass.

[21] Appl. No.: 573,105

[22] Filed: Dec. 15, 1995

[51] Int. Cl.$^6$ ................................................. G06K 7/10
[52] U.S. Cl. ........................ 235/462; 385/120; 235/473
[58] Field of Search .................. 250/227.29, 227.26; 385/120; 235/462, 473

[56] References Cited

U.S. PATENT DOCUMENTS

| | | | |
|---|---|---|---|
| 3,510,195 | 5/1970 | Noble | 385/120 |
| 4,323,925 | 4/1982 | Abell et al. | 358/213 |
| 4,785,171 | 11/1988 | Dowling, Jr. et al. | 250/227.29 |
| 4,818,886 | 4/1989 | Drucker | 235/462 |
| 4,843,222 | 6/1989 | Hochgraf | 235/470 |
| 4,963,756 | 10/1990 | Quan et al. | 235/462 |
| 4,978,860 | 12/1990 | Bayley et al. | 235/462 |
| 5,124,537 | 6/1992 | Chandler et al. | 235/462 |
| 5,198,648 | 3/1993 | Hibbard | 235/462 |
| 5,308,966 | 5/1994 | Danielson et al. | 235/472 |

*Primary Examiner*—Donald T. Hajec
*Assistant Examiner*—Mark Tremblay

[57] ABSTRACT

A machine vision system images bar code labels moving through a horizontal plane at variable object distances within the system's object depth of field $Z_{obj}$ with a plurality of sequential line images, each with different object lengths which gradate $Z_{obj}$ into plural focused object planes, and the object plane within which the bar code label lies provides a focused optical image of the bar code to a multilinear photodetector which transduces the focused optical image into a corresponding electrical signal for further processing.

9 Claims, 3 Drawing Sheets

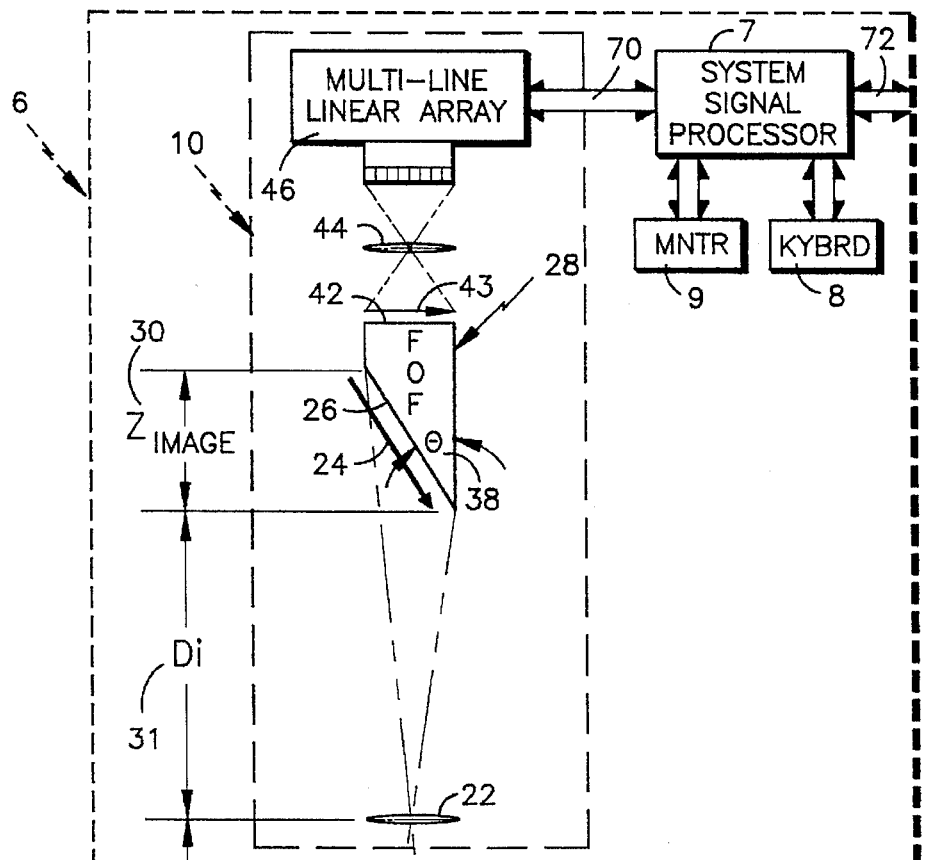
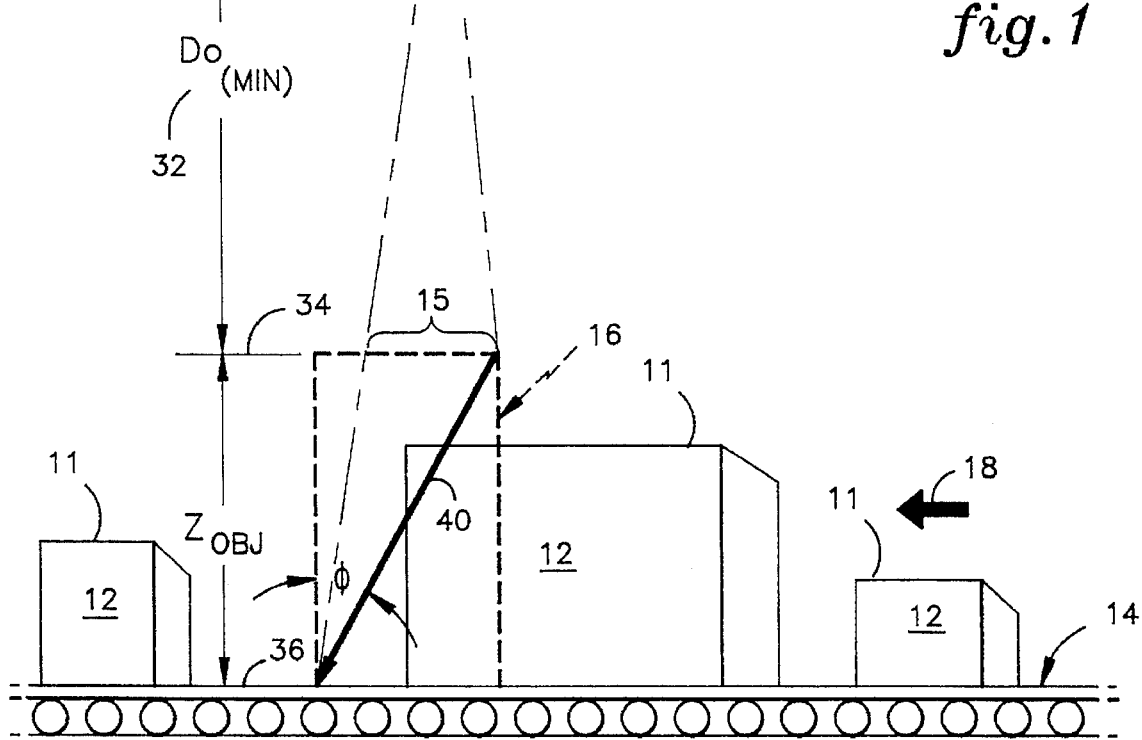
fig.1

5,633,487

MULTI-FOCAL VISION SYSTEM

TECHNICAL FIELD

This invention relates to machine vision systems, and more particularly to vision systems for reading bar codes.

BACKGROUND ART

The parcel shipment industry is increasing the pace of automation in its package-handling and warehousing requirements to reduce delivery time and cost of handling. One such initiative includes the use of machine vision systems (optical readers) to automatically scan packages, without operator intervention, to read the package applied bar code which identifies the package routing, destination, and shipper/addressee. This application's challenge, however, is the necessarily high accuracy standard required to prevent misinformation in the shipping data despite the random depth of field requirements and random placement of the bar code within the camera's field-of-view due to variation in package size and placement on a conveyor belt.

In a typical application, the camera must focus on packages ranging in height from 0–36 inches with an image resolution suitable to read a 10 mil (0.010 inch; approximately 0.25 mm) character font bar code. Prior art vision systems meet these requirements by using vision equipment which measures the parcel height at an upstream position on the conveyer belt. The sensed height data is then used to command the position of a zoom lens of a dynamic focus camera placed downstream, which mechanically positions its lens to capture a focused bar code image. This, however, requires the use a camera with moving mechanical parts.

For improved operational reliability and speed of response it is preferred to use a static focus system which satisfies the range and resolution requirements without dynamic motion.

DISCLOSURE OF INVENTION

An object of the present invention is to provide a machine vision system for reading bar code labels appearing at variably distant horizontal planes within an object depth of field $Z_{obj}$. Another object of the present invention is to provide a machine vision system capable of providing, in response to the system's receipt of signal indicia of the parcel's height, real time focused images of bar codes placed on exposed surfaces of variable height parcels as they pass through an object depth of field $Z_{obj}$.

According to the present invention, a machine vision system uses plural sequential line images, each with a different object length, to gradate the vertical space of Z into plural focused object planes, whereby the focused object plane within which the bar code label lies provides a focused optical image of the bar to a multilinear photodetector which transduces the focused optical image into a corresponding electrical signal for further processing. In further accord with the present invention, the system includes a camera having a fiber optic faceplate (FOF) comprising an image coherent waveguide with an image receiving surface that is angularly displaced from normal to the horizontal plane of $Z_{obj}$ to provide the receiving surface with plural object distances through the vertical space of $Z_{obj}$ each object distance corresponding to a different coordinate location along the plane trajectory of the displaced receiving surface, the FOF further comprising an optical grating that is coaxially aligned with the waveguide and comprising plural, optically transparent plateaus disposed in a stepped trajectory parallel to that of the displaced receiving surface, each plateau associated with the receiving surface coordinates of a different one of the object distances and each plateau associated with the field of view of a different one of the camera's line images.

In still further accord with the present invention, individual lines of the multilinear detector are positioned in registration with individual plateaus of the grating to allow each line to receive the line image of a different segment of the vertical space of $Z_{obj}$, thereby associating each array line with a distinct vertical segment of $Z_{obj}$ and allowing the individual line containing the focused line image to be immediately identified by the received parcel height signal indicia and to have its image processed to obtain bar code information in real time.

The machine vision system of the present invention staticly scans the horizontal plane of the system's object field with plural line images having a field of view that extends in a parallel and a transverse direction to a designated travel path through the object field. Each line image has a different object distance, thereby providing multiple different focused object planes within a selected object depth of field ($Z_{obj}$), and the object plane coincident with the height of the exposed surface of a parcel passing along the travel path provides the camera's focused image of the exposed surface and any bar code present thereon.

These and other objects, features, and advantages of the present invention will become more apparent in light of the following detailed description of a best mode embodiment thereof, as illustrated in the accompanying Drawing.

BRIEF DESCRIPTION OF DRAWING

FIG. 1 is a schematic illustration of a best mode embodiment of the camera system of the present invention for use in reading parcel bar codes;

BEST MODE FOR CARRYING OUT THE INVENTION

Figure 2:
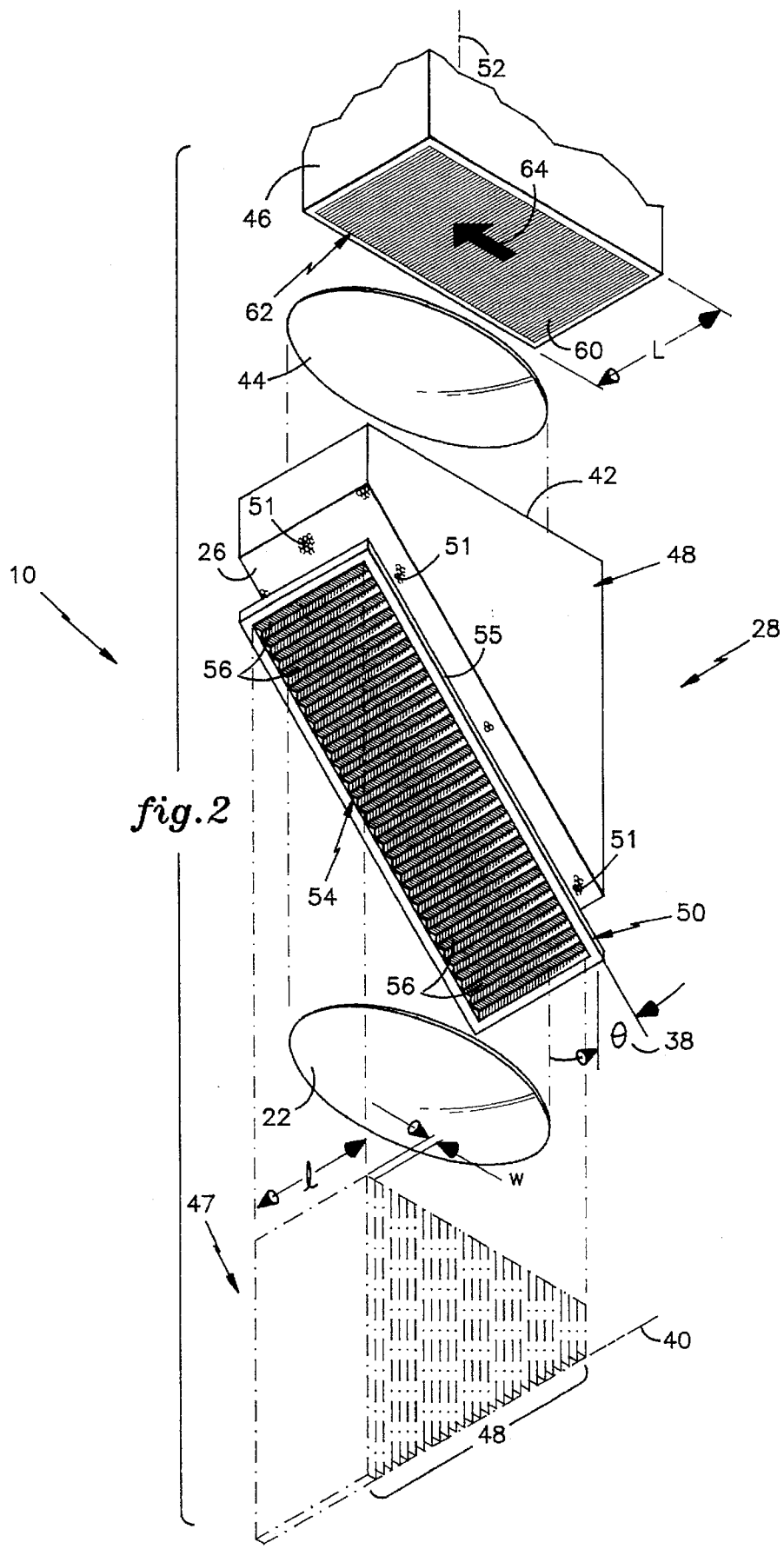
FIG. 2 is an exploded, perspective view, not to scale, of the elements included in one component of the system of FIG. 1.
Figure 3:
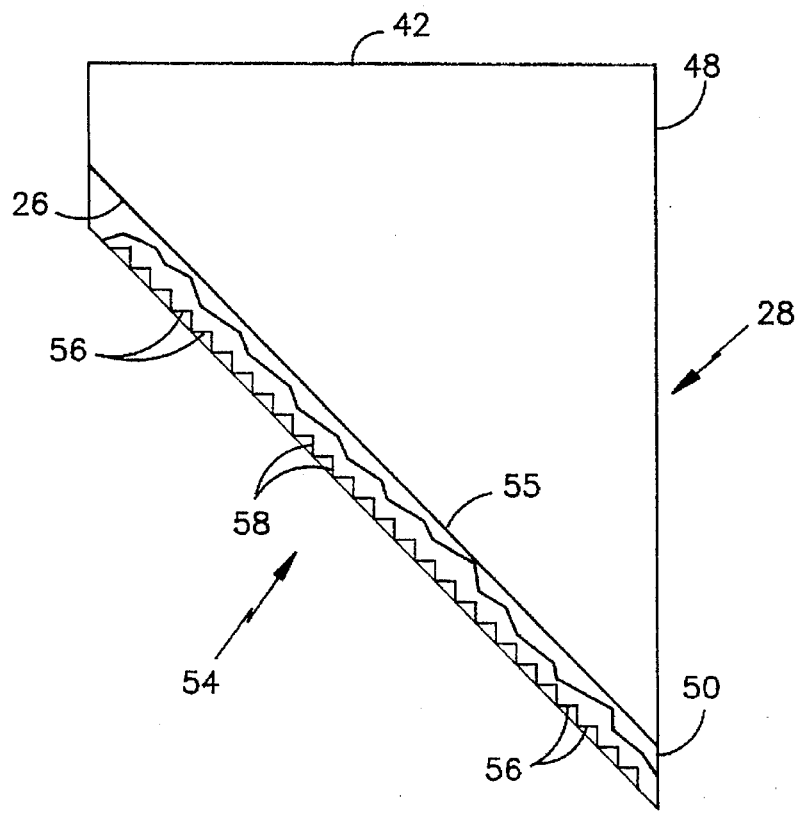
FIG. 3 is a side elevation, partially broken away, of one of the elements illustrated in FIG. 2.

FIG. 1 is a schematic diagram of a best mode embodiment of the present invention's multi-focal vision system 6. The system 6 includes: a system signal processor 7, such as a DOS based PC with an INTEL®PENTIUM® microprocessor having a standard full keyset keyboard 8 and SVGA 256 color video monitor 9; and a static focus camera 10. In the illustrated embodiment the system 6 is used to read optical bar codes placed on exposed surfaces 11 of random height parcels 12 transported by conveyer belt 14 through the system's field-of-view (FOV) 15.

Preferably, the system's camera 10 is positioned above the belt 14 and views the parcel surfaces 11 as they pass through the camera's object field 16 in a given travel direction 18. Dimensionally, the horizontal plane of the object field 16 extends in a direction transverse to the travel path of the belt 14, and its vertical plane extends through a working, object depth of field $Z_{obj}$, 20. $Z_{obj}$ represents the range of possible parcel heights over which the camera must obtain focused bar code images. A typical $Z_{obj}$=36 inches (914.4 mm).

The camera 10 includes a multi element imaging lens 22 which images objects within the object field 16, at a large demagnification, into image space 24 on the input surface 26 of a fiber optic faceplate (FOF) 28. The imaging lens 22 is a glass lens designed for camera use, such as a 35 mm film camera. The lens images the parcel surfaces 11, which appear at different object distances ($D_o$) within the depth of field $Z_{obj}$ 20, into an image depth of field $Z_{image}$ 30 at the input surface 26.

The FOF input surface 26, as described in detail hereinafter, is cut at a steep bias angle (θ). To achieve a practical value for this bias angle the imaging lens 22 must maintain a substantially constant image distance $D_i$ for object distances ranging from a minimum ($D_{o\ min}$ 32), for near view objects (maximum height parcels) appearing at the near extreme 34 of the object depth of field ($Z_{obj}$), to a maximum $D_{o\ max}=D_{o\ min}+Z_{obj}$, for objects appearing near the surface 36 of the belt 14 (e.g. envelopes).

This depth sensitivity is taken into account in the optical design of the imaging lens by selecting lens parameter values which minimize the image distance sensitivity to changes in object distance. We begin with the standard (lens maker's) imaging equation:

$$1/d_o + 1/D_i = 1/F \quad \text{(Eq. 1)}$$

where: $D_o$ is the object distance, $D_i$ is the image distance, and F is the focal length. Solving Eq. 1 for $D_i$ and taking the partial differential $\delta(D_i)/\delta D_o$, produces the result:

$$\frac{\delta(D_i)}{\delta D_o} = \frac{F}{(D_o - F)} - \frac{(D_o * F)}{(D_o - F)^2} \quad \text{(Eq. 2)}$$

From this, values of $D_o$ and F are selected such that $\delta(D_i)/\delta D_o$ is small while satisfying the application's requirements for the working object depth of field $Z_{obj}$ and the image depth of field $Z_{image}$. By way of example, $\delta(D_i)/\delta D_o$ is small for combinations of F equal to or less than 200 mm, and $D_o$ greater than 2000 mm. If we assume an application having a required $Z_{obj} \approx 900$ mm, a desired demagnification of 14–18, a minimum read resolution (minimum character width) of 0.010 inches, and an f/4 aperture, we see from Table 1 that a lens with a clear aperture (CA) diameter of 50 mm

TABLE 1

| ($Z_{obj}$) | $D_{o\ min}/D_{o\ max}$ | $D_{1\ max}/D_{1\ min}$ | Magnification | CA/F. | Image Resolution |
|---|---|---|---|---|---|
| 900 mm | 3000/3900 mm | 214/210 mm | 0.071/0.054 | 50/200 | 0.004/0.005 in. | and a 200 mm focal length (F) produces a $\delta(D_i)/\delta D_o = +/-1\%$ for a +/−13% change in $D_o$ from 3000–3900 mm ($D_o=3450+/-450$ mm). The minimum image resolution of the lens (0.005 inches at $D_o=3900$ mm) is twice the required resolution.

Referring again to FIG. 1, the input surface 26 of the FOF 28 is cut at a bias angle θ (38) so as to tilt the image space of the input surface (90− θ)° from the horizontal plane of the object field 16, thereby creating a (90− φ)° displaced primary image plane 40 within the object field 16. As described hereinafter, the camera 10 achieves static focusing of the parcel surfaces 11 by providing a plurality of sequential line images, each having a different object distance within the range of object distances $D_{o\ min}$ 32 and the belt surface 36, to provide a plurality of spaced object focal planes through the vertical space of $Z_{obj}$. The primary image plane 40 represents the locus of these individual line image object distances, which increase (decrease) for succeeding (preceding) line images occurring along the trajectory of the plane 40 through the $Z_{obj}$ space. As each parcel surface 11 intercepts the primary image plane, the focused object plane whose object distance corresponds to the intercept coordinates of the surface 11 with the plane, provides a focused image of the surface to a corresponding intercept coordinate location on the FOF input surface 26.

The FOF 28 maintains the coherency and registration of the received line images as they propagate from the FOF input surface 26 to an FOF output surface 42. The output surface 42 of the faceplate is orthogonal to the FOF axis (the optical axis of the camera 10) so that the tilted image space 24 at the receiving surface 26 is transformed to an untilted image 43 at the output surface. The line images are then re-imaged through relay lens 44 onto a multilinear detector array 46, in which each line of the array is mapped into a distinct height region in belt space.

Referring now to FIG. 2, which is an unscaled, exploded view of the axially aligned elements of the camera 10. These include, from input to output, the imaging lens 22, the FOF 28, the relay lens 44, and a partial cutaway of the multilinear detector array 46. For purposes of teaching only, FIG. 2 also shows, in figurative fashion, the system's pattern of line images 47. Each line images has a length ι, which extends transverse to the direction of belt travel, and a minimum width (W), which extends in the direction of belt travel and which is small enough to satisfy the minimum read resolution, e.g. 10 mils (0.010 inch) character font at the required object distance. The locus of the line image object lengths 48 form the trajectory of the primary image plane (40, FIG. 1). The field of view of adjacent line images overlap to an extent such as to ensure that the sum of the line images provide a composite image of the vertical space through the $Z_{obj}$ working depth of field.

The total number of line images ($N_{lines}$) required in a given application is a function of the working depth of field $Z_{obj}$ (20, FIG. 1) and the required depth of focus ($DOF_{line}$) of the photodetector array 46. The value of $DOF_{line}$ is defined by the application's working object distance $D_o$ (where $D_o=D_{o\ max}$), the clear aperture (CA) diameter of the imaging lens 22, and the minimum resolution (R) required for the application, as defined by the equation:

$$\frac{1}{DOF_{line}} = \frac{1}{D_o} * \frac{CA}{R} \quad \text{(Eq. 3)}$$

If $D_o=3900$ mm; CA=50 mm; and R=5 mil (0.005 inch), then $DOF_{line}=390$ mils.

The minimum number of lines required in the array is given by:

$$N_{lines} = \frac{Z_{obj}}{DOF_{line}} \quad \text{(Eq. 4)}$$

where for $Z_{obj}=36$ inches (36000 mils); $N_{lines} \approx 92$.

The FOF 28 includes an optical fiber waveguide 48 mounted to a transparent interface structure (i.e. grating structure) 50. The waveguide 48 comprises an optical substrate impregnated with image coherent optical fibers 51 (shown figuratively) which are arrayed axially, with strict spatial (axial) alignment and relatively constant spacing, between the FOF input surface 26 and output surface 42. This allows the line images received at the input surface 26 to remain image coherent over their length of travel to the output surface 42; typically on the order of 10–20 mm. The optical fibers 51 have a low core ($\eta 1$) to cladding ($\eta 2$) index difference (typically $\eta 1$=1.5 and $\eta 2$=1.3). They are of a known commercial type, such as that used in night vision goggles and in spectroscopic detectors, and have a diameter on the order of 4–7 µm.

The input and output ends 26, 42 of the fiber waveguide 48 are each cut and polished. The end face of the fibers at the input surface 26 are cut at the bias angle θ (38, FIG. 1) so as to displace the plane of their end face by the angle θ from the optical axis 52 (shown in phantom) of the camera 10, and produce the (90− φ)° degree displaced primary image plane 40. The value of the bias angle θ is a function of the required image depth of field $Z_{image}$ and the line length (L) of the multilinear array 46, and is equal to:

$$\theta = \tan^{-1}(Z_{image}/L) \quad \text{Eq. 5}$$

The angle is relatively steep; ranging from about 0.1 to about 0.5 radians (approximately 5 to 30 degrees), depending on the specific application. If the line images were received directly at this steeply tilted, polished surface, up to 40% of the received light would be lost due to Fresnel reflection. This would make the FOF 28 very polarization sensitive. Therefore, a critical and novel feature of the FOF design is the transparent interface structure 50.

Referring again to FIG. 2, the structure 50 includes a tilted sensor end 54 at a first major surface thereof, and a distal, second major surface 55 (this is the structure's back surface in FIG. 2 which is not visible in the illustration). The plane of the sensor end 54 and that of the back surface 55 are similarly displaced by an equivalent angle value θ from the camera optical axis 52 and, therefore, substantially parallel to the FOF input surface 26.

Figure 4:
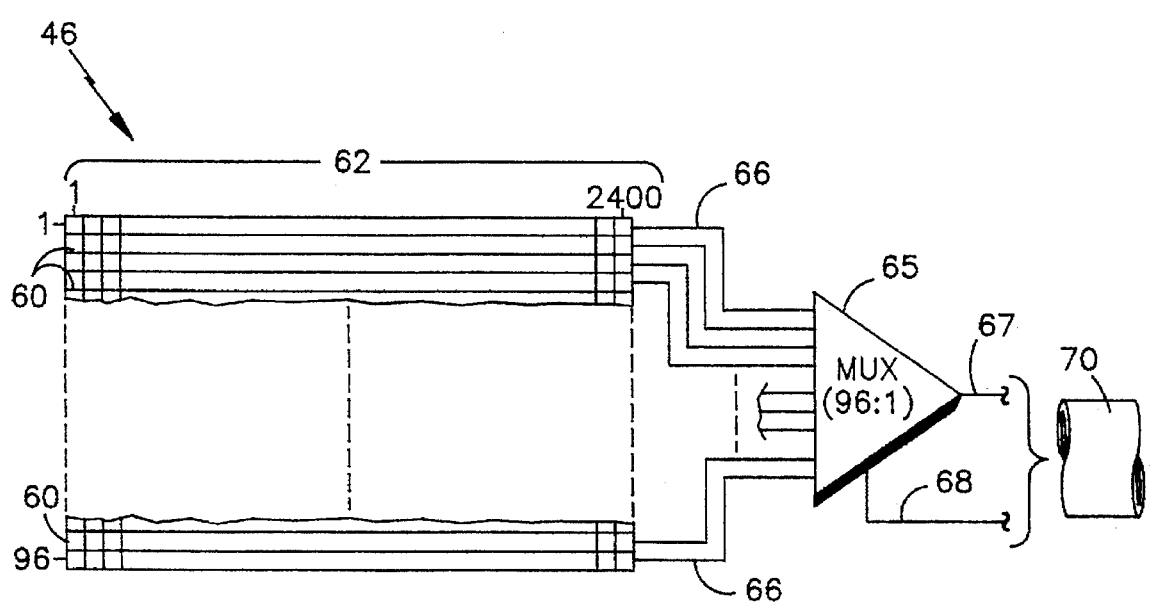
FIG. 4 is a schematic diagram of another element illustrated in FIG. 2.

The sensor end 54 comprises a plurality of substantially equal dimension, stepped plateaus 56. The plateaus 56, which are more clearly shown in the partial cut-away, side elevation view of the housing in FIG. 4, are spaced apart at step intervals 58. The plateaus divide the image space 24 (FIG. 1) of the FOF input surface 26 into the number of line images ($N_{lines}$) required to gradate the $Z_{obj}$ vertical space into plural focused object planes. The dimensions of the plateaus are substantially equal, and they establish the corresponding, equal geometry and field of view of the line images.

In the best mode embodiment, the transparent structure and stepped array are fabricated from an optical epoxy which, preferably, has a refractive index substantially equal to that of the optic fibers 51. The epoxy is a known type, such as an ultra violet (uv) curing type epoxy. The geometric features of the stepped array are produced through known transfer techniques, which replicate the plateau geometry of the sensor end 54 from a micro-machined master tool. Table 2 lists the example dimensions for a structure 50 for use with

TABLE 2

| Array Height | Array Depth | Array Width | Bias Angle θ | Fiber Size | No. Steps |
| --- | --- | --- | --- | --- | --- |
| 10 mm | 3 mm | 18 mm | 10.9° | 4 µm | 96 | the imaging lens described hereinbefore with respect to Table 1.

Each plateau is substantially orthogonal to the axes of the waveguide fibers 51 at the input surface 26. This allows the received line images from the lens 22 to enter the FOF 28 at near normal incidence. The near normal incidence and the matching indices between structure and fiber, provides maximum transmission of the received light. In this manner the stepped plateau structure functions as an index-matching element between the free air and the glass of the optical fibers.

In assembly, the structure 50 is mounted to the waveguide 48 by bonding the structure's second major surface 55 (the back surface of the structure as illustrated in FIG. 2) to the input surface 26 of the waveguide. The bonding agent is preferably optical epoxy, but any other known bonding agents may be used as deemed suitable by those skilled in the art to meet the performance standards for the particular camera.

The relay lens 44 is an optional element of the camera 10, and is used primarily to gain flexibility in the relative placement of the FOF 28 to the detector array 46. The lens may be eliminated with close proximal placement of the FOF output 42 in register with the detector's array lines 60. Alternatively, the lens 44 may be used to provide an anamorphic image of the FOF output 42 to the detector, as required to fit the X and Y coordinates of the image to the array lines.

The lens 44 projects each of the received line images from the primary image plane (40, FIG. 1) onto an associated one of the lines 60 within the detector's multi linear array 62. The number of lines 60 corresponds to the $N_{lines}$ number of line images, and in turn to the number of plateaus 56. The relative positioning of the FOF output 42 and detector array 62 is such that each plateau is nominally in register with an associated one of the detector lines 60. Therefore, the array 62 receives a line-by-line composite image of the entire $Z_{obj}$ vertical space, in which each of the lines (referred to also as detector rows) 60 is associated with a quantified segment of $Z_{obj}$. A focused bar code image will then appear in the line (row) whose $Z_{obj}$ vertical segment coincides with the height of the parcel surface on which the bar code appears. Each line transduces its received line image into an electrical data signal representative of the optical image appearing within the system's composite line image FOV of the object field at that distance which is proximate to the object distance of the particular object focal plane.

In the best mode embodiment, the photodetector array 46 is a charge coupled device (CCD). The read resolution of the photodetector is the overall limiting factor on the resolution of the system 6. In the above described application the system 6 must be capable of resolving a 0.010 inch width character bar code. Nominally, the minimum system resolution is half that required, or 0.005 inches in this case. This corresponds (after demagnification) to a minimum 6.9 µm resolution at the detector 46. A detector with a pixel diameter of 7 µm is suitable. The diameter of the optic fibers in the bundle 48 are chosen to be less than the array pixel diameter, and in this application a fiber diameter of 4 µm was selected.

The nominal length of the plateaus 56 (and the line images 47) is established by the detector line length, which is in turn determined by the width of the conveyer belt. In the disclosed embodiment each detector line contains (2400) 7 µm diameter pixels for an approximate line length of 17 mm. The minimum width of the plateaus 56 are established by the detector's pixel diameter (7 µm). The total number of fibers in each 17 mm×7 µm dimensioned plateau is determined on the low side by the desired image granularity and on the high side by the achievable packing density of the fibers. It may range from one row of 2400 fibers per plateau to one or more rows of 4800 each.

The present system 6 operates in conjunction with an upstream dimensioning system which provides a signal indication of parcel height. The dimensioning system may be any one of a number of known optical systems which measure the dimensions of the parcels 12, including the height of the parcel surface 11 above the belt surface 36. The sensed height magnitude is converted to a signal magnitude whose full scale is correlated to $Z_{obj}$. Similarly, the array lines 60 are correlated to $Z_{obj}$ by their quantified segment, such that each line 60 has a corresponding signal magnitude on the full scale of the dimensioning system. In this manner each height signal magnitude may be correlated with a specific array line containing the focused bar code image.

Therefore, in the present vision system, the array 62 gradates the working depth of field $Z_{obj}$ into vertical segments, each of which are correlated with a corresponding line of the array and to an associated value of a height signal magnitude received from an upstream dimensioning system, such that only the one line of the array which is at the correct focus is read out to develop the image necessary for the bar code reading. The out-of-focus image data in all of the remaining lines are discarded.

FIG. 4 is a schematic block diagram of the detector 46, with lines 60 positioned lengthwise in the array 62 so as to be substantially in register with the length dimension ι of the line images (47, FIG. 2); transverse to the parcel direction of travel (64, FIG. 2). In the best mode embodiment the array 62 is a modified Time Delay and Integrate (TDI) array. As known, TDI arrays are charge coupled device (CCD) detectors in which the charge data is read out serially, one line at a time. In operation, a standard TDI array laterally shifts the charges in each row downward to the next lower row between exposure periods, from the first row to the last row, until they emerge onto the bottom-most line of the array and are read out serially.

In the described application, and for purposes of example only, the present array is shown to be a 96 line by 2400 pixels per line array. An on-chip multiplexor (MUX) 65 receives each array line on a corresponding one of an equal plurality of MUX input lines 66. The MUX may access and read out, on MUX output lines 67, the image data of an array line identified on MUX address lines 68. The MUX output and address lines 67, 68 are included in input/output lines 70 connecting the camera 10 to the system signal processor 7 (FIG. 1).

Referring to FIG. 1, the signal processor 7 receives each parcel's height signal magnitude on lines 72 from the dimensioning system (not shown). The processor correlates each height signal magnitude to a corresponding line address signal which is presented to the MUX on address lines 68, causing the MUX to read out the image data on the addressed line. Since each line is correlated to a vertical segment of the object field only the array line corresponding to the height signal magnitude will have to be accessed to obtain a focused image of the parcel bar code.

The detector's electrical data signal equivalent of the focused image is processed by the signal processor to translate the data content of the received signal to determine the information content of the accessed bar code font pattern. The translation algorithm and processing software used may be any one of the number of prior art computer programs deemed suitable for use by those skilled in the art for processing bar code data in applications of this type.

The MUX 65 controls which pixels, from which array line are output from the camera 10 within each frame. Each addressed line of pixels must be read out serially, and the number of pixels required by each array 60 is equal to:

$$\frac{\text{(belt width} \times \text{demagnification)}}{\text{pixel diameter}}$$

As newly available technologies, such as those used in charge Injection Devices (CID) and MOSFET switched arrays, mature they may be preferred over the modified TDI array since they will allow the desired array lines to be addressed in a direct X, Y fashion, even in segments, rather than the parallel-serial readout disclosed in FIG. 4. Nevertheless, the basic principals of accessing only those portions of the array which contain in focus information from the scanned field is the same.

In the present vision system, the selection of the correct readout line in the camera array is the result equivalent of the prior art systems which drive an active optical element to the correct focal position. In the present camera, however, the action occurs more quickly, and without mechanical motion, thereby improving efficiency and reliability while providing a sensed accuracy that is at least equal to, if not better than the prior art dynamic focus systems.

Similarly, the prior art dynamic focus cameras fail to perform in a situation where, due to the random nature of parcel placement, multiple, different height parcels passing simultaneously (side-by-side) rather than sequentially through the object field. The mechanical response time of the camera limits the ability to dynamically focus on both parcels. In the present system, however, side-by-side parcels are read simply by selecting the multiple detector lines that are in focus (those associated with the proper heights of the different parcels).

Although the invention has been shown and described with respect to a best mode embodiment thereof, it should be understood by those skilled in the art that various changes, omissions, and additions may be made to the form and detail of the disclosed embodiment without departing from the spirit and scope of the invention recited in the following claims.

We claim:

1. A machine vision system, for obtaining a focused optical image of an object appearing within a variable distance horizontal plane of an object field of the system comprising:

a) a camera means, having an optical axis, said camera means for providing a simultaneous plurality of line images, each one of said simultaneous plurality of line images having a field of view (FOV) of a transverse segment of the variable distance horizontal plane and each of said FOVs having a different object length, to provide a system object depth of field ($Z_{obj}$) having a composite FOV of the variable distance horizontal plane and having a vertical extent that is segment gradated over a range of said different object lengths into a plurality of different distance object focal planes, each said plurality, of different distance object focal planes providing an optical image of objects appearing therein, said camera means comprising;

i) a detector means, having a plurality of photodetector elements linearly arrayed in a plurality of detector lines, for receiving said optical image from said plurality of different distance object focal planes, each of said plurality of detector lines transducing said optical image from an associated one of said plurality of different distance object focal planes into an electrical data signal representative of said optical image appearing within said composite FOV at a distance proximate to one of said different distance object lengths associated with one of said plurality of different distance object focal planes;

ii) a fiber optic faceplate (FOF), located along said optical axis for transmitting the optical image to said detector means, comprising:

an image coherent waveguide having coaxial input and output ends, said input end being positioned in optical registration with said plurality of different distance object focal planes and having a receiving surface whose surface plane is angularly displaced from the variable distance horizontal plane to receive said optical image at said different object lengths therefrom, said output end being positioned in optical registration with said plurality of detector lines;

an optical grating structure mounted coaxially to said receiving surface and comprising a plurality of optically transparent plateau surfaces disposed along a stepped trajectory which is substantially parallel to said receiving surface, each of said plurality of optically transparent plateau surfaces being associated with one of said line images and with a different object length region of said receiving surface to thereby provide an optical signal interface between a related one of said plurality of different distance object focal planes and said corresponding object length region of said receiving surface; and b) signal processing means, responsive to said electrical data signal from each of said plurality of detector lines, for processing to obtain therefrom an electrical data signal content representative of a focused optical image.

2. The system of claim 1, wherein:

said plurality of optically transparent plateau surfaces provide an image registration of said line images with said receiving surface to form a composite FOV image, said image coherent waveguide substantially maintaining said image registration of said composite FOV image provided at said output end to said detector means; and said plurality of detector lines each receiving the focused optical image of an associated one of said plurality of different distant object focal planes to allow each of one of said plurality of detector lines to be associated with a distinct object distance and a distinct transverse segment of $Z_{obj}$.

3. The system of claim 1, wherein:

said FOF comprises a monolith of optical material impregnated with a plurality of image coherent optical fibers, each having a core diameter and a core material index of refraction, said plurality of optical fibers being axially arrayed in substantially constant relative alignment from said receiving surface to said output end; and said plurality of optically transparent plateau surfaces being substantially orthogonal to an axis of said plurality of optical fibers, with a plateau material index of refraction substantially similar in optical characteristics to that of said core material index of refraction.

4. The system of claim 1, wherein said detector means comprises a charge coupled device array of pixels, each said pixel having a pixel diameter which is no greater in dimension than that of said optical images of the bar code character font provided to said receiving surface.

5. The system of claim 1, wherein said camera means further comprises:

imaging lens means, positioned in optical registration with said plurality of different distance object focal planes, coaxially with said FOF, said imaging lens means providing said focused optical image at said different object lengths from said plurality of different distance object focal planes to said receiving surface at an image depth of field $Z_{image}$ which is substantially constant relative to said object depth of field $Z_{obj}$.

6. The system of claim 5, wherein:

said imaging lens means provides said focused optical image to said receiving surface at a demagnification gain.

7. The system of claim 2, wherein said camera means further comprises:

relay lens means, positioned intermediate to said output end of said FOF and said detector means, for relaying the focused optical image appearing at said output end from said optical fibers to said plurality of detector lines.

8. The system of claim 7, wherein said relay lens comprises an anamorphic lens to optically translate a set of spatial coordinates of said focused optical image from said output end to a set of array coordinates of said plurality of detector lines.

9. The system of claim 4, wherein said detector means further comprises:

switching means, responsive to a signal input thereof to each of said plurality of detector lines, and responsive to an address input thereof to a line address signal presented thereto by said signal processing means, for providing at a signal output thereof the electrical data signal content resident in those of said plurality of detector lines that are identified thereto by said address signal.

* * * * *